United States Patent
Nebuya et al.

(10) Patent No.: US 7,090,046 B2
(45) Date of Patent: Aug. 15, 2006

(54) PEDAL RETRACTION AMOUNT CONTROL APPARATUS

(75) Inventors: Hideto Nebuya, Utsunomiya (JP); Takashi Sugiyama, Utsunomiya (JP); Shigeki Nomura, Utsunomiya (JP); Shinji Kumagai, Haga-gun (JP); Tsuyoshi Kobayashi, Shioya-gun (JP); Yusuke Muramatsu, Shioya-gun (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/442,405

(22) Filed: May 21, 2003

(65) Prior Publication Data
US 2004/0040409 A1 Mar. 4, 2004

(30) Foreign Application Priority Data
Jun. 12, 2002 (JP) .......................... P2002-171962

(51) Int. Cl.
*B60K 28/10* (2006.01)
(52) U.S. Cl. ..................................... 180/274; 74/512
(58) Field of Classification Search .................. 180/90, 180/274, 275, 315, 316; 74/512, 513
See application file for complete search history.

(56) References Cited

U.S. PATENT DOCUMENTS

| | | | |
|---|---|---|---|
| 5,921,144 A * | 7/1999 | Williams et al. | 74/512 |
| 6,006,626 A * | 12/1999 | Notake et al. | 74/512 |
| 6,041,674 A * | 3/2000 | Kato | 74/512 |
| 6,055,883 A * | 5/2000 | Kato | 74/512 |
| 6,070,488 A * | 6/2000 | Yabusaki et al. | 74/512 |
| 6,076,422 A * | 6/2000 | Tabata | 74/512 |
| 6,142,036 A * | 11/2000 | Mizuma et al. | 74/512 |
| 6,176,340 B1 * | 1/2001 | Mizuma et al. | 180/274 |
| 6,327,930 B1 * | 12/2001 | Ono et al. | 74/512 |
| 6,336,376 B1 * | 1/2002 | Lee | 74/512 |
| 6,408,711 B1 * | 6/2002 | Mizuma et al. | 74/512 |
| 6,418,812 B1 * | 7/2002 | Mizuma et al. | 74/512 |
| 6,443,028 B1 * | 9/2002 | Brock | 74/512 |
| 6,655,489 B1 * | 12/2003 | Kawai et al. | 180/274 |
| 6,701,800 B1 * | 3/2004 | Saitou et al. | 74/512 |
| 6,708,792 B1 * | 3/2004 | Hirata | 180/274 |
| 6,742,411 B1 * | 6/2004 | Aoki et al. | 74/512 |
| 6,752,038 B1 * | 6/2004 | Cordero | 74/512 |
| 6,810,766 B1 * | 11/2004 | Mizuma | 74/512 |

FOREIGN PATENT DOCUMENTS

EP 0 805 080 11/1997

(Continued)

*Primary Examiner*—Paul N. Dickson
*Assistant Examiner*—Toan C. To
(74) *Attorney, Agent, or Firm*—Hamre, Schumann, Mueller & Larson, P.C.

(57) ABSTRACT

A pedal retraction amount control apparatus is provided which can sufficiently move a pedal from a passenger compartment in the forward direction of the vehicle during a front collision.

An attachment plate 29 of a front portion of a pedal bracket 24 which supports a support shaft 27 of a pedal 23 is secured to a dash panel 12, and a connecting member 30 of a rear portion of the pedal bracket 24 is attached to a cowl panel 32 so as to be detachable when the pedal bracket is moved rearward, and a steering hanger 17 is arranged facing in order to contact during a front collision a rear portion of a displacement restricting section 50 which extends in a crosswise direction of the vehicle and which is disposed below the support shaft 27.

15 Claims, 10 Drawing Sheets

FOREIGN PATENT DOCUMENTS

| | | |
|---|---|---|
| EP | 1 134 128 | 9/2001 |
| JP | 10-44947 | 2/1998 |
| JP | 10-250624 | 9/1998 |
| JP | 11-43073 | 2/1999 |
| JP | 2000-142339 | 5/2000 |

* cited by examiner

PEDAL RETRACTION AMOUNT CONTROL APPARATUS

BACKGROUND OF THE INVENTION

1. Field of the Invention

The present invention relates to a pedal retraction amount control apparatus for a running vehicle.

2. Description of the Related Art

As a pedal retraction amount control apparatus for a running vehicle which prevents a pedal from moving in a rearward direction with respect to a vehicle body, and moving into a passenger compartment side at the time of a vehicle head-on collision, there is, for example, the apparatus disclosed in Japanese Patent Publication No. 3239790. In the apparatus disclosed in this publication, when at the time of a vehicle head-on collision, the vehicle body is deformed so that the whole pedal system moves in the rearward direction of the vehicle, a steering hanger which is provided on a horizontal beam member connecting between pillars restricts the movement of this pedal in the rearward direction beneath the support shaft of the pedal. As a result, the pedal rotates about the support shaft so that the tread portion moves towards the front side, and is thus moved from the passenger compartment in the forward direction.

In a pedal retraction amount control apparatus, the greater the amount of forward movement of the pedal the better. However, in the abovementioned case, the amount of forward movement of the pedal is mainly determined by the rotation amount of the pedal about the support shaft, and there are cases where this is not sufficient.

SUMMARY OF THE INVENTION

Accordingly, the present invention aims to provide a pedal retraction amount control apparatus which can sufficiently move the pedal from the passenger compartment in the chassis front direction.

In order to achieve the above objective, a pedal retraction amount control apparatus according the first aspect of the present invention comprises a front portion (for example the attachment plate 29 in the embodiment) of a pedal bracket (for example the pedal bracket 24 in the embodiment) which supports a support shaft (for example the support shaft 27 in the embodiment) of a pedal (for example the pedal 23 in the embodiment) secured to a dash panel (for example the dash panel 12 in the embodiment), a rear portion (for example the connecting member 30 in the embodiment) of the pedal bracket attached to a cowl panel (for example the cowl panel 32 in the embodiment) so as to be removable when moved in the rearward direction, and a steering hanger (for example the steering hanger 17 in the embodiment) arranged facing a rearward portion of a displacement restricting section (for example the displacement restricting section 50 in the embodiment) which extends to the right and left sides of the vehicle in a crosswise direction from a position below the support shaft of the pedal.

As a result of the above structure, at the time of a vehicle head-on collision and when the dash panel is pushed so as to move in the rearward direction of the vehicle due, for example, to a power unit provided in a front section of the vehicle moving toward the rear section, the pedal bracket attached to the dash panel together with the pedal including the displacement restricting section move towards the rear section of the vehicle, so that the displacement restricting section abuts against the steering hanger which is arranged facing the rear portion of the vehicle. Then, if the pedal moves to the rearward further, the displacement restricting section provided beneath the support shaft is pushed by the steering hanger, and as a result, the pedal rotates in the forward direction to move the tread portion to the front of the vehicle. Simultaneously, the pedal bracket secured to the dash panel moves in the rearward direction, so that the front portion thereof separates from the cowl panel to which it is attached, and only the front portion is supported in a cantilever condition. In this condition, the pedal is pressed by the steering hanger and rotates as far as the rotation limit, and when further pressed, since the displacement restricting section extends to the side in the crosswise direction, a twisting force is applied to the pedal in a direction to move the displacement restricting section to the front side of the vehicle while turning about a vertical rotation axis. As a result, the pedal bracket in a condition cantilevered by only being supported at the front portion, is deformed so that the pedal turns so as to rotate about a rotation axis, and the tread portion is moved even further to the front section of the vehicle. As a result of the above, the pedal moves beyond the rotation limit of the support shaft of the pedal and moves to the forward side of the vehicle.

In a pedal retraction amount control apparatus according to the second aspect of the present invention, and also related to that of the first aspect, a rigidity of the pedal bracket on the extension side of the displacement restricting section corresponding to the crosswise direction of the vehicle is less than a rigidity on the opposite side.

As a result, when a twisting force is input to the pedal in a direction to move the displacement restricting section to the front side of the vehicle while turning about the rotation axis, the pedal bracket in the crosswise direction of the vehicle whose rigidity is made lower than that in the opposite direction, is easily deformed. Consequently the pedal further moves by turning about the rotation axis, and the tread portion is reliably moved to the front side of the vehicle. As a result, the pedal goes beyond the rotation limit of the support shaft of the pedal and reliably moves to the forward side of the vehicle.

In a pedal retraction amount control apparatus according to the third aspect of the present invention, and also related to that of the second aspect, a reinforcing member (for example the reinforcing member 45 in the embodiment) is attached to the pedal bracket on the opposite side to the extension side of the displacement restricting section corresponding to the crosswise direction of the vehicle.

Since in this way the central portion of the pedal is curved so as to form a curved portion, when the pedal falls by turning about the rotation axis, the tread portion can be made to move even more to the forward side of the vehicle.

In a pedal retraction amount control apparatus according to the fourth aspect of the present invention, and also related to that of the first through third aspects, a central portion of the pedal is curved so as to form a inwardly curved portion.

Since in this way the central potion of the pedal is curved so as to form a curved portion, when the pedal falls by turning about the rotation axis, the tread portion can be made to move even more to the forward side of the vehicle.

In a pedal retraction amount control apparatus according to the fifth aspect of the present invention, and also related to that of the first through fourth aspects, the pedal bracket is made elongated in a direction connecting between the front portion and the rear portion, and a horizontal beam member (for example the horizontal beam member 16 in the embodiment) which connects between two pillars in the forward portion of the vehicle and which supports the steering hanger, is provided below the extension line of the pedal bracket parallel to the strected direction of the pedal bracket.

As a result, in the case where the pedal bracket moves backward along the lengthwise direction, the pedal bracket moves above the horizontal beam member, and interference of the pedal bracket with the horizontal beam member can be prevented.

In a pedal retraction amount control apparatus according to the sixth aspect of the present invention, and also related to that of the first through fifth aspects, a steering shaft (for example the steering shaft 46 in the embodiment) is arranged on the opposite direction of the pedal bracket to the extension direction of the displacement restricting section stretching in the crosswise direction of the vehicle.

As a result, when the pedal falls by turning about the rotation axis, and the tread portion is moved to the forward side of the vehicle, the pedal which falls over to the extension side of the displacement restricting section does not interfere with the steering shaft on the opposite side to the extension side of the displacement restricting section. As a result, the turning of the pedal about a vertical rotation axis is not restricted by the steering shaft.

DETAILED DESCRIPTION OF THE INVENTION

A pedal retraction amount control apparatus of a first embodiment of the present invention will be described hereunder with reference to the attached drawings.

Figure 1:
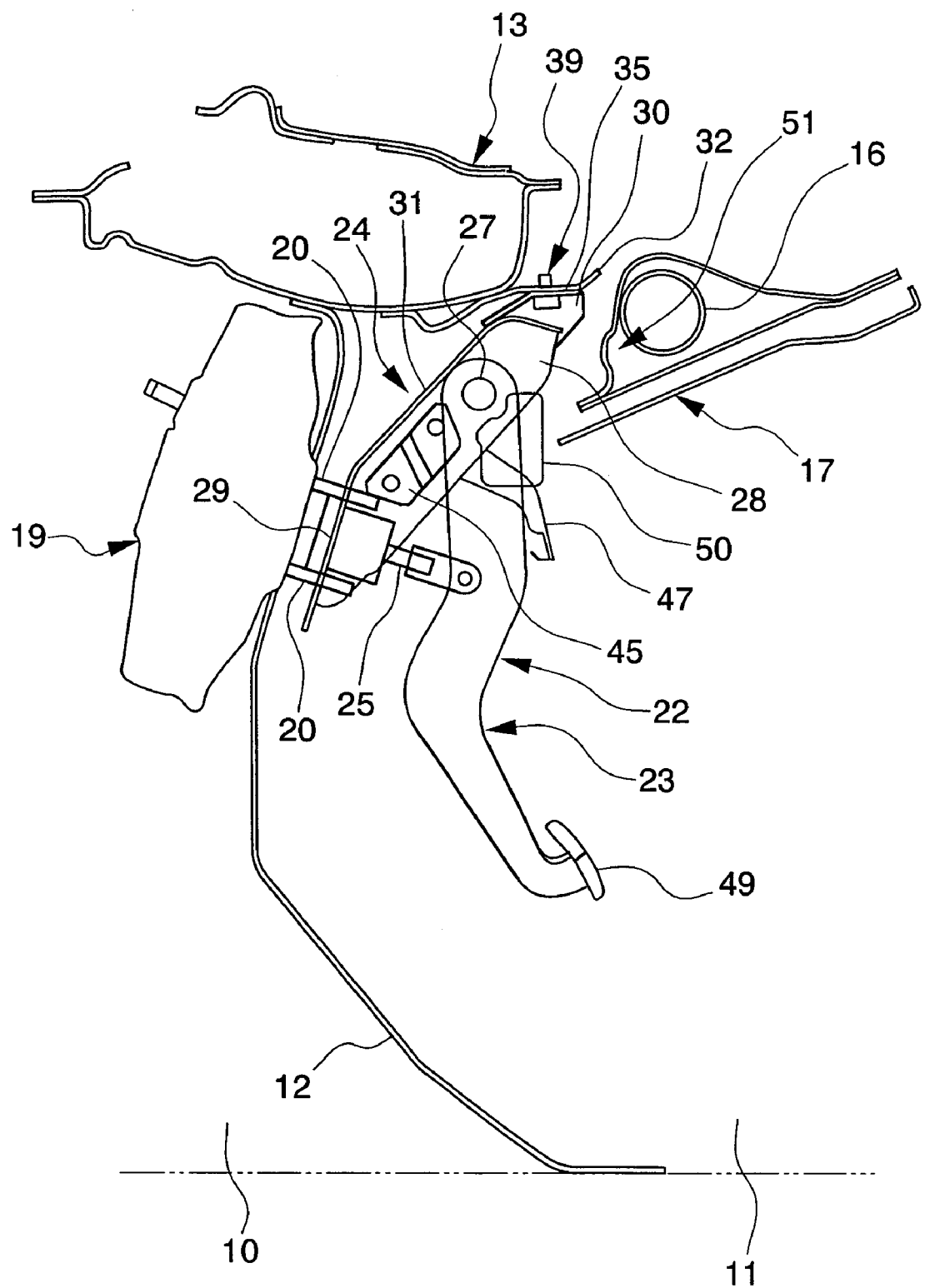
FIG. 1 is a side cross-section showing a pedal retraction amount control apparatus according to an embodiment of the present invention, and a configuration of the vehicle in the vicinity thereof.

In FIG. 1, reference symbol 10 denotes an engine room on a front side of the vehicle (left side in FIG. 1), in which a power unit and the like (not shown in the figure) are arranged, reference symbol 11 denotes a passenger compartment on the rearward side (right side in FIG. 1) of the engine room 10 which houses crews, reference symbol 12 denotes a dash panel which partitions the engine room 10 and the passenger compartment 11, and reference symbol 13 denotes a cowl box provided above the dash panel 12.

On the rearward side of the cowl box 13, there is arranged a pipe shape horizontal beam member 16 made of metal or the like, being a structure member which extends in the crosswise direction and connects between pillars (not shown in the figure) of the chassis front portion. A steering hanger 17 is attached to this horizontal beam member 16, and a steering wheel (not shown) is supported on this steering hanger 17.

A brake booster 19 is attached to an upper portion of the dash panel 12 in the engine room 10, and a pedal assembly 22 is attached to a plurality of attachment bolts 20 which protrude into the passenger compartment 11 side from this brake booster 19. That is to say, the pedal assembly 22 includes a brake pedal 23, and is secured to the dash panel 12 via the brake booster 19.

The pedal assembly 22 has a pedal bracket 24 attached by a plurality of attachment bolts 20 of the brake booster 19, and the pedal 23 which is connected to a push rod 25 which drives the brake booster 19, and which is supported on the pedal bracket 24 so as to be rotatable about an axis along the crosswise direction of the vehicle.

Figure 2:
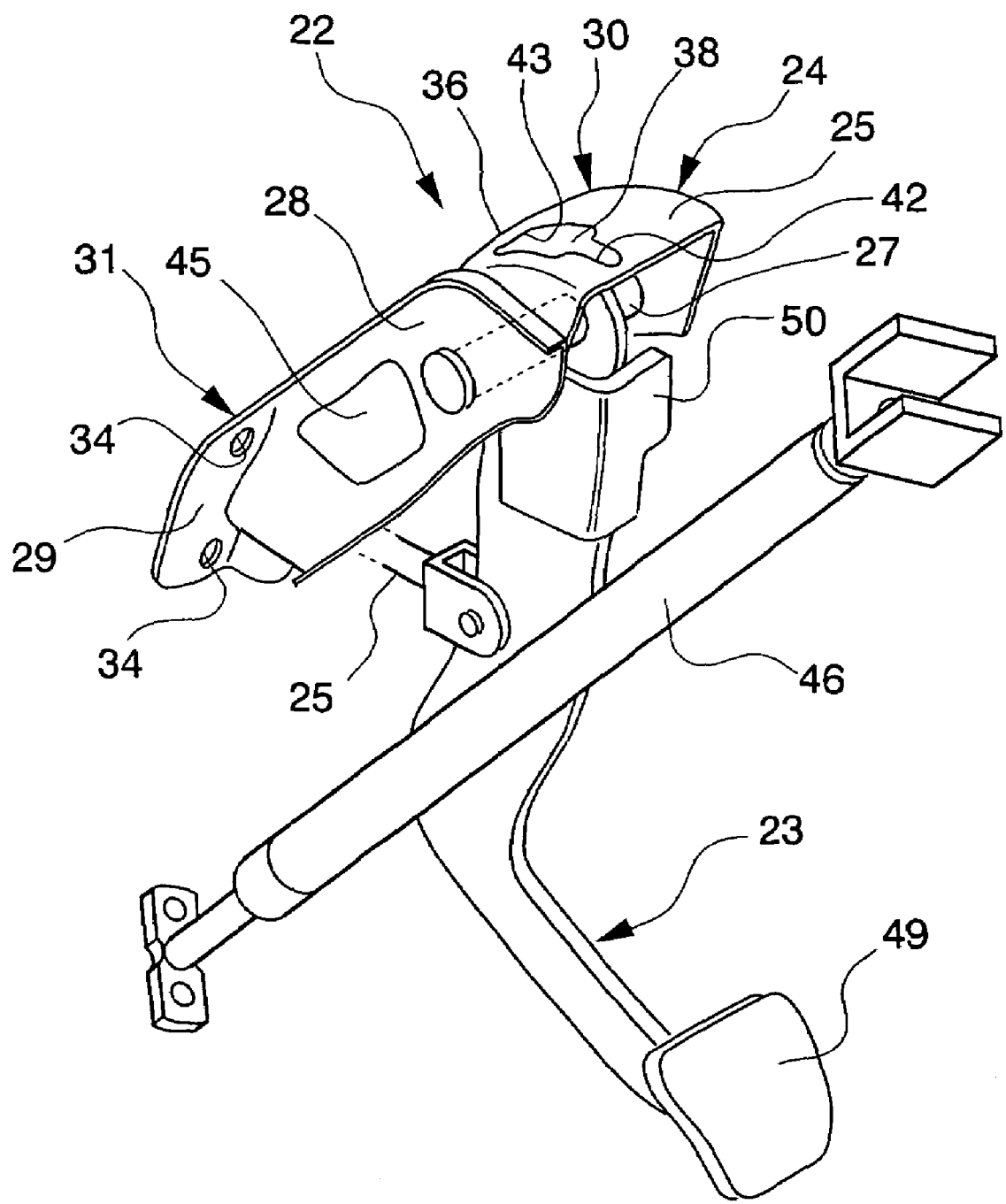
FIG. 2 is a perspective view showing a pedal assembly including one part of the pedal retraction amount control apparatus according to the embodiment of the present invention, and a steering shaft.

The pedal bracket 24 is of elongate shape approximately straight in one direction, and as shown in FIG. 2, has a pair of left and right support members 31, each of which has a support plate 28 which supports a support shaft 27 being the rotation center of the pedal 23, in a state perpendicular to the axis thereof, and an attachment plate 29 which extends perpendicularly from the support plate 28 provided on one lengthwise end, and a connecting member 30 which connects the two support plates 28, provided on the other lengthwise ends. Regarding the pedal bracket 24, the attachment plates 29 are fixed on the rear face side of the dash panel 12 through the brake booster 19, and the connecting member 30 on the opposite end to the attachment plates 29, is attached to the lower face of a cowl panel 32 which extends rearward of the cowl box 13. As a result, the pedal bracket 24 is arranged with the front portion fixed to the dash panel 12, and the rear portion attached to the cowl panel 32, so to span between the dash panel 12 and the cowl panel 32 at a corner formed by the dash panel 12 and the cowl panel 32.

More specifically, the pedal bracket 24 is secured to the brake booster 19 by inserting the attachment bolts 20 of the brake booster 19 into attachment holes 34 multiply formed in the attachment plates 29 on both sides, and while not illustrated in the figure, clamping the attachment plates 29 with cylindrical collars provided on the attachment bolts 20 on the front side of the attachment plate 29, and nuts which are threaded onto the attachment bolts 20 on the rear side of the attachment plates 29.

Figure 3A:
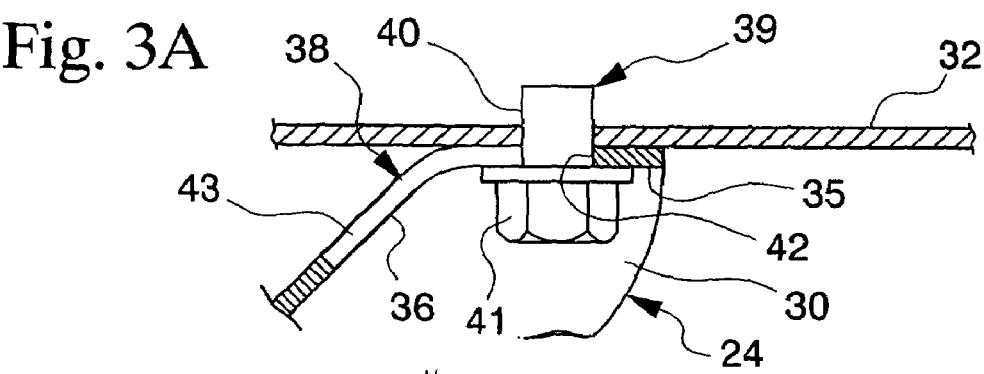
FIGS. 3A and 3B are views showing one condition of a connecting portion for a pedal bracket and a cowl panel of the pedal retraction amount control apparatus according to the embodiment of the present invention, 3A being a partial enlarged side section, and 3B being a bottom view.
Figure 3B:
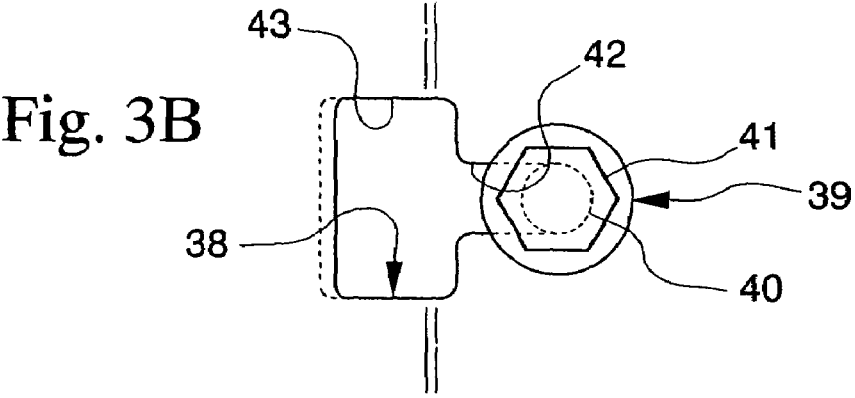

In a condition with the attachment plates 29 secured to the brake booster 19 in this manner, the connecting member 30 of the pedal bracket 24 which is on the opposite end to the attachment plate 29 as shown in FIG. 3, contacts with the lower face of the cowl panel 32 with a contact plate 35 which is parallel to the cowl panel 32, and a batten plate 36 connected to the chassis front side of the contact plate 35 is inclined so as to be positioned further downward towards the forward side of the vehicle. Moreover, a mounting hole 38 spanning from the contact plate 35 to the batten plate 36 is formed in the connecting member 30.

This mounting hole 38 constitutes an upside down T-shape which is formed by connecting an engagement aperture 42 having a width wider than a threaded shaft 40 of an engaging bolt (engaging portion) 39 which is threaded from the bottom face side into the cowl panel 32, and a width narrower than a head portion 41, and a batten portion 43 which is wider than the width of the head portion 41 of the engaging bolt 39. Here the engagement aperture 42 is formed in the contact plate 35, while the batten aperture 43 is formed in the batten plate 36.

When the pedal bracket 24 is secured to the brake booster 19 at an initial position wherein the movement thereof in the longitudinal direction of the vehicle is basically restricted, then as shown in FIG. 3, the mounting hole 38 has the threaded shaft 40 of the engaging bolt 39 which is threaded onto the cowl panel 32 positioned inside the engagement aperture 42. As a result, the pedal bracket 24 is engaged with the head portion 41 of the engaging bolt 39, so that downward movement is restricted. Here, so that the engaging bolt 39 is able to move relatively in the longitudinal direction of the vehicle with respect to the mounting aperture 38, the head portion 41 thereof is attached to the cowl panel 32 in a condition having a gap slightly wider than the thickness of the contact plate 35 between the cowl panel 32 and itself.

Figure 4A:
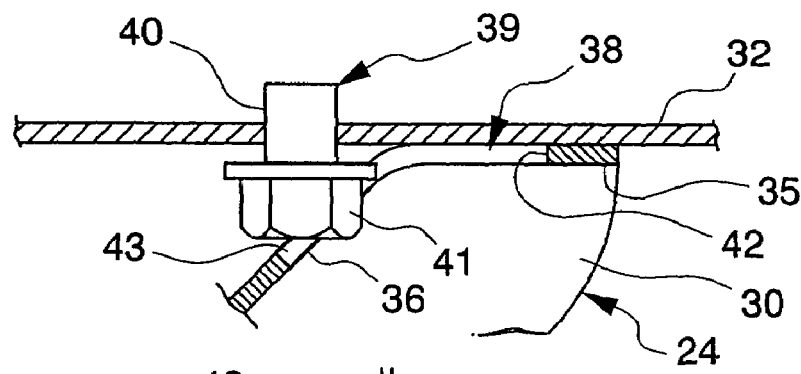
FIGS. 4A and 4B are views showing a different condition of the connecting portion for the pedal bracket and the cowl panel of the pedal retraction amount control apparatus according to the embodiment of the present invention, 4A being a partial enlarged side section, and 4B being a bottom view.
Figure 4B:
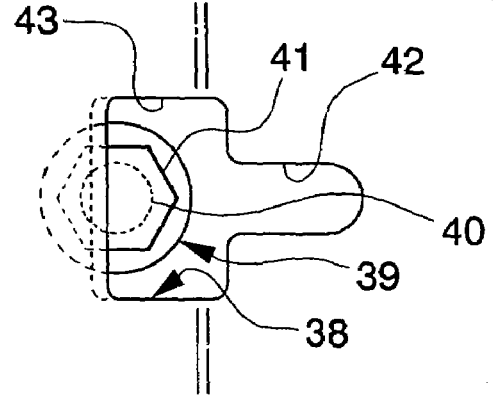

Then, when the pedal bracket 24 is moved from this condition rearward of the vehicle, the mounting hole 38 is also moved in the rearward direction with respect to the engaging bolt 39, and as shown in FIG. 4, the head portion 41 of the engaging bolt 39 passes through the punch aperture 43 formed in the inclined punch plate 36, so that the head portion 41 comes out from the mounting aperture 38, and the pedal bracket 24 separates from the engaging bolt 39, that is the cowl panel 32.

Due to the above structure, the front portion of the pedal bracket 24 which rotatably supports the support shaft 27 of the pedal 23 is secured to the dash panel 12, and the rear portion of the pedal bracket 24 is attached to the cowl panel 32 so as to be removable when it moves in the rearward direction of the vehicle.

Here, on one side of the pedal bracket 24 in the chassis crosswise direction, more specifically on the outside of the left side support plate 28 only, a plate shape reinforcing member 45 is secured. As a result, the rigidity of the aforementioned one side of the pedal bracket 24 in the crosswise direction of the vehicle, more specifically the support plate 28 on the left side, is higher than the rigidity of the support plate 28 on the opposite side.

As shown in FIG. 1, the horizontal beam member 16 which supports the steering hanger 17 is arranged on the lower side of a line extending in the rearward direction along the lengthwise direction of the pedal bracket 24. Furthermore, as shown in FIG. 2, the pedal bracket 24 is arranged on the opposite side of a steering shaft 46 to the aforementioned one side in the crosswise direction, more specifically on the right side. Moreover, as shown in FIG. 1, a brake switch bracket 47 which holds a brake switch (not shown in the figure) is attached to the pedal bracket 24.

The pedal 23, more specially is a brake pedal, and as shown in FIG. 1 and FIG. 2 has a central part which is curved, and on one end is provided the support shaft 27 with the axis arranged in the crosswise direction of the vehicle and supported on the support plates 28 of the pedal bracket 24, while on the other end is provided a tread portion 49 which is subjected to a pressing operation by the driver. The pedal 23 is arranged with the support shaft 27 at the top side and the tread portion 49 at the bottom, and moreover is supported on the pedal bracket 24, in a condition with the tread portion 49 positioned to the occupant side. By curving the pedal 23 from the central portion, the tread portion 49 is directed downwards from the curved portion and consequently is inclined so as to be positioned on the occupant side.

Figure 5:
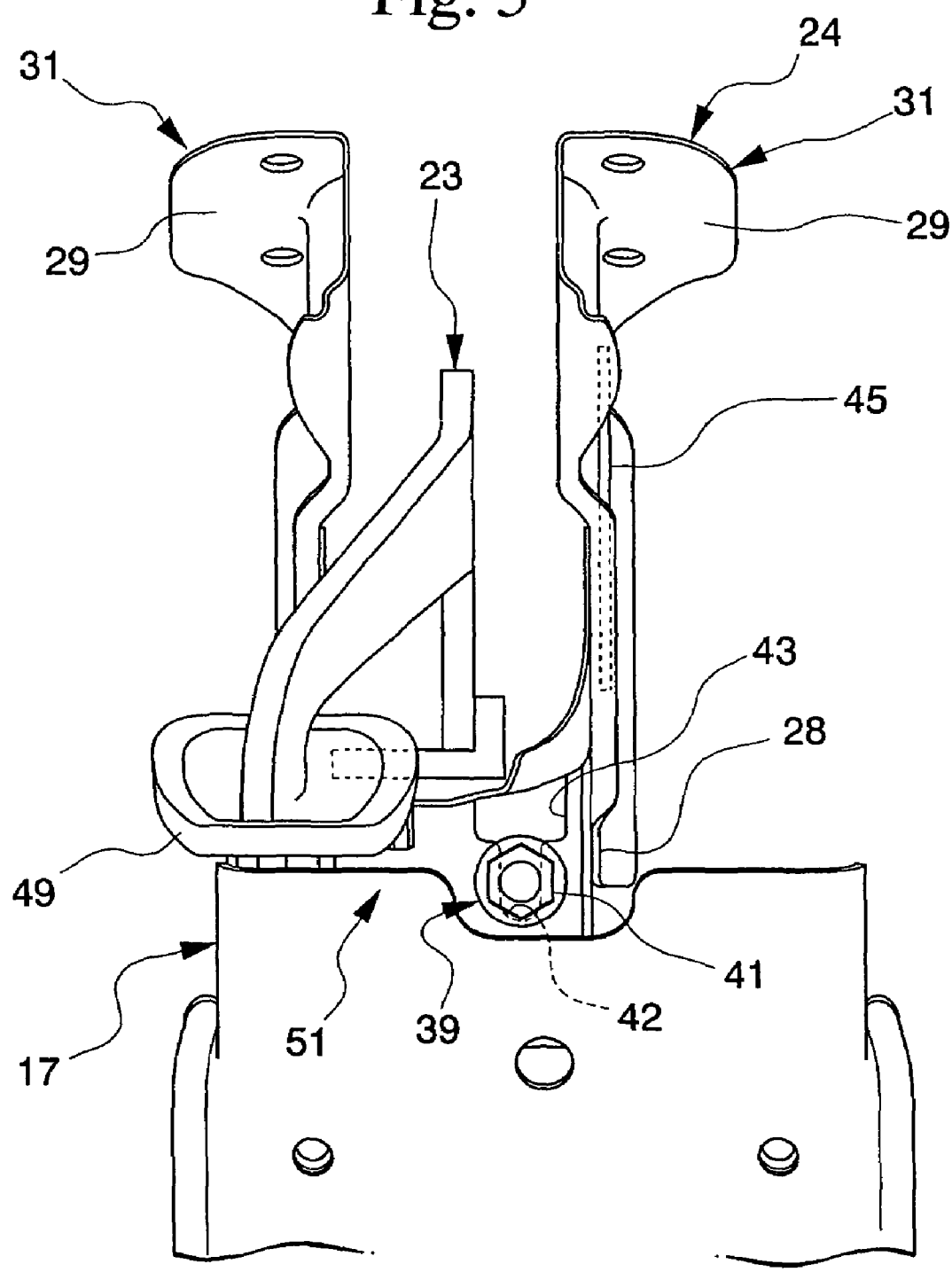
FIG. 5 is a bottom view showing the pedal retraction amount control apparatus according to an embodiment of the present invention.

The support shaft 27 of the pedal 23 is arranged on the upper side of the pedal bracket 24, and as shown in FIG. 2 and FIG. 5, on a rear side of the pedal 23 below the support shaft 27, there is provided a displacement restricting section 50 extending to the crosswise direction, more specifically to the right side, being the opposite side to the aforementioned one side. Moreover, the edge of the steering hanger 17 on the front side of the vehicle is arranged so as to face with a slight gap in the rear side of the displacement restricting section 50, on the aforementioned opposite side from the center in the crosswise direction of the pedal 23. Furthermore, as shown in FIG. 1 and FIG. 2, below the displacement restricting section 50 of the pedal 23, that is between the displacement restricting section 50 and the tread portion 49, is connected the push rod 25 for the brake booster 19.

As a result of the above, by attaching the reinforcing member 45 to the crosswise direction opposite side of the pedal bracket 24 to the extension side of the displacement restricting section 50, the rigidity on the extension side of the displacement restricting section 50 in the crosswise direction of the vehicle is lower than the rigidity on the opposite side. Furthermore, as shown in FIG. 2, the steering shaft 46 is arranged on the crosswise direction opposite side of the pedal bracket 24 to the extension side of the displacement restricting section 50.

The abovementioned pedal bracket 24, engaging bolt 39, displacement restricting section 50 of the pedal 23, and steering hanger 17 constitute the pedal retraction amount control apparatus 51 of the present embodiment.

In the pedal retraction amount control apparatus 51 of the present embodiment as described above, at normal times the displacement restricting section 50 provided integral with the pedal 23 is separated to the front side of the vehicle from the steering hanger 17 over the whole range of rotation of the pedal 23, and has no influence on the operation of the pedal 23.

Figure 6:
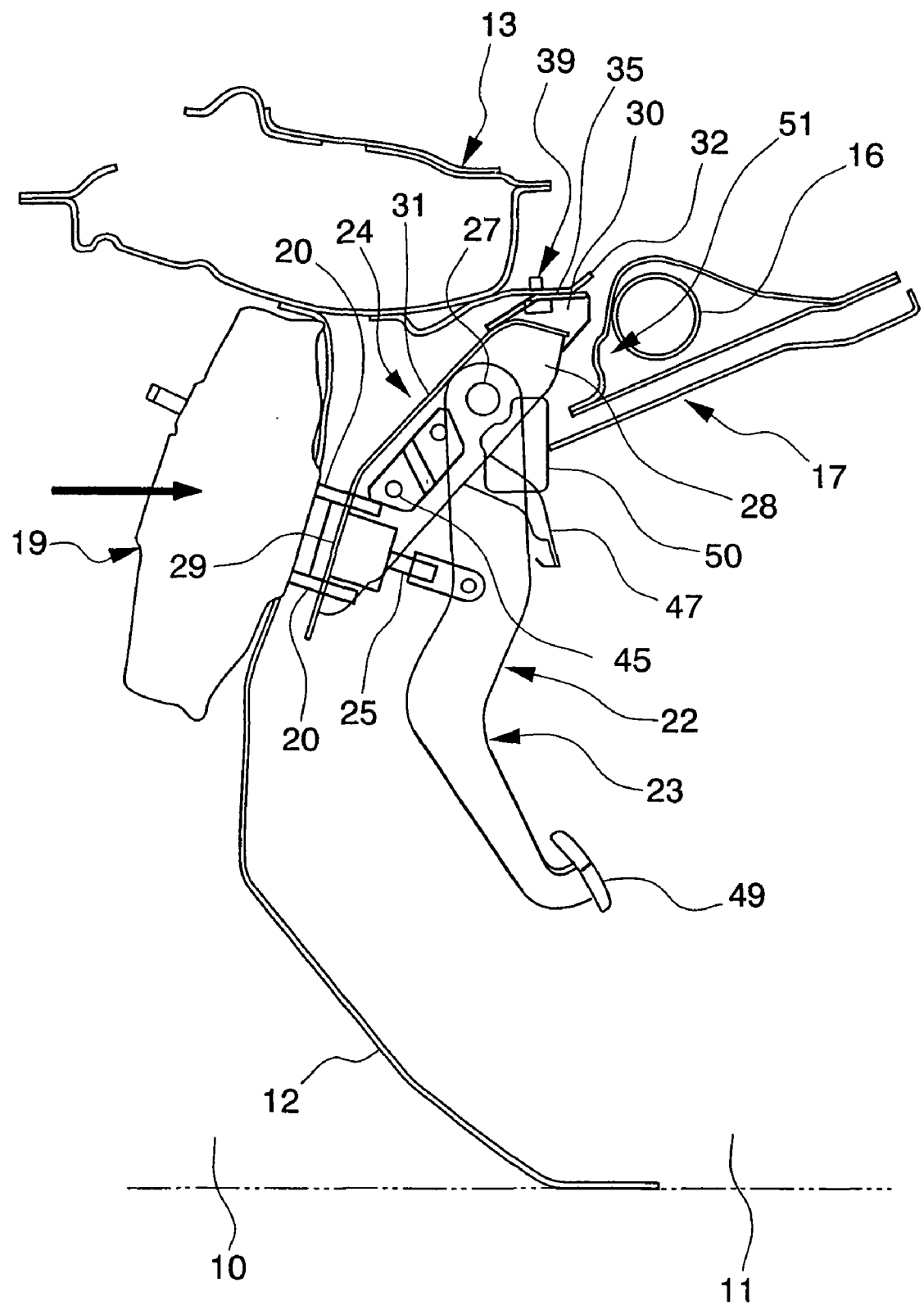
FIG. 6 is a side section view showing the pedal retraction amount control apparatus according to an embodiment of the present invention and a configuration of a vehicle in the vicinity thereof, showing a condition at the time of a head-on collision of the vehicle.
Figure 8:
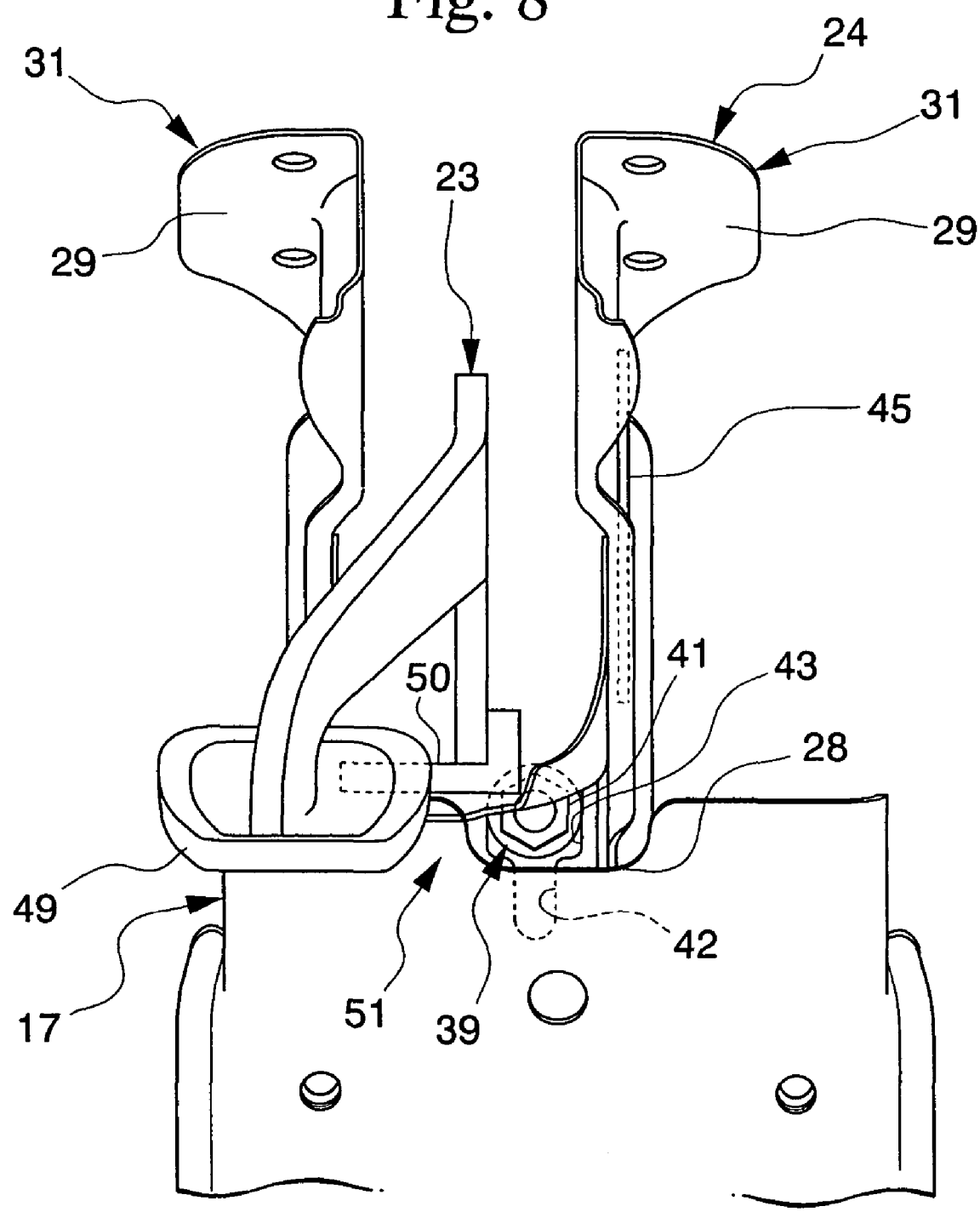
FIG. 8 is a bottom view showing in outline, the pedal retraction amount control apparatus according to the embodiment of the present invention, showing a condition at the time of a head-on collision of the vehicle.

On the other hand, at the time of a vehicle head-on collision, when the dash panel 12 is pushed so as to move in the rearward direction due for example to the power unit provided in the engine room 10 in the front section of the vehicle moving in the rearward direction, then as shown in FIG. 6 and FIG. 8, the pedal bracket 24 attached to the dash panel 12 together with the pedal 23 including the displacement restricting section 50 move in the rearward direction, so that the displacement restricting section 50 abuts against the steering hanger 17 which is arranged facing the rear portion side thereof. At this time, so that the displacement restricting section 50 reliably contacts the front edge of the steering hanger 17, the width in the crosswise direction of the vehicle is maintained.

Figure 7:
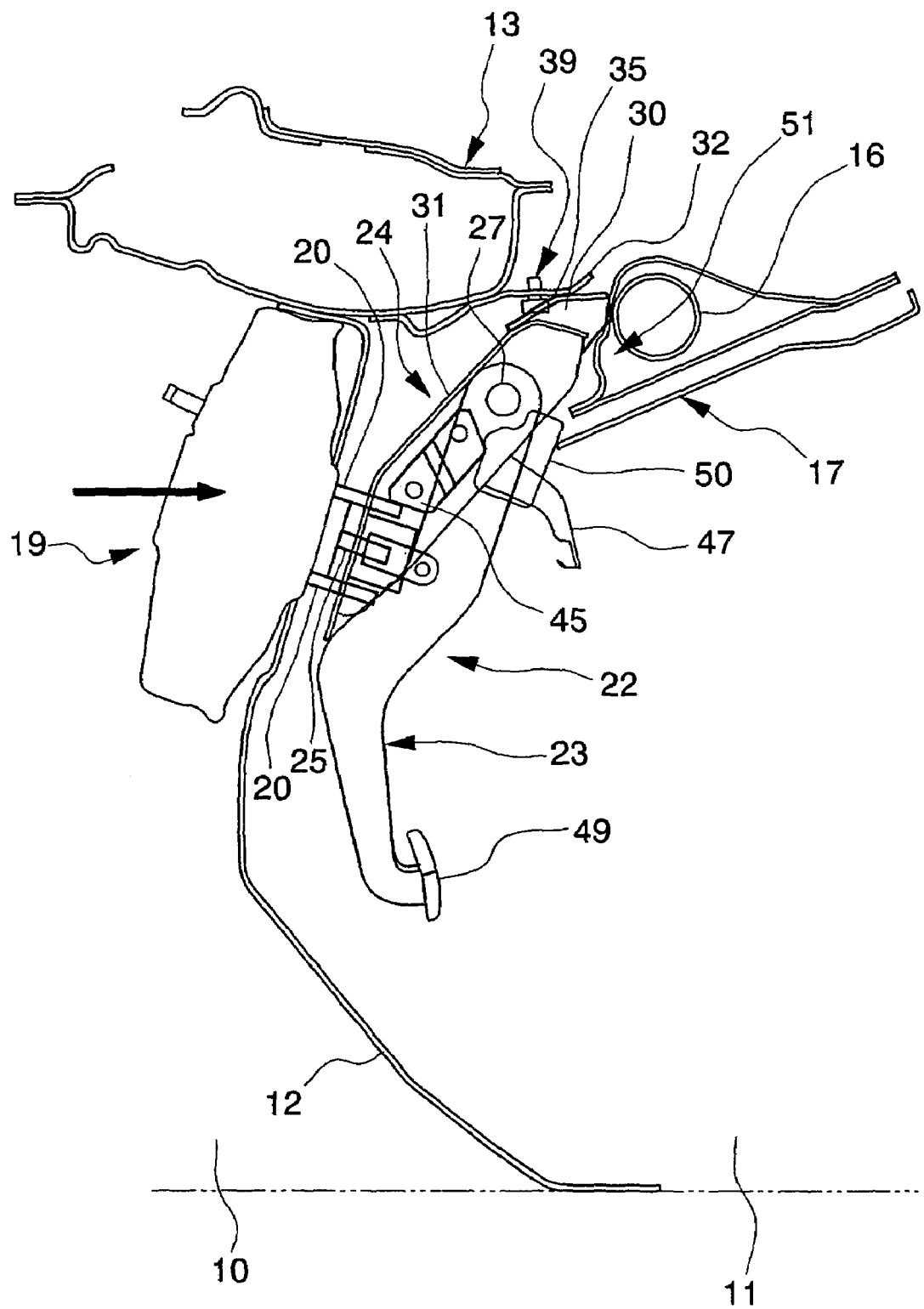
FIG. 7 is a side section view showing the pedal retraction amount control apparatus according to the embodiment of the present invention and the vehicle configuration in the vicinity thereof, showing another condition at the time of a head-on collision of the vehicle.
Figure 9:
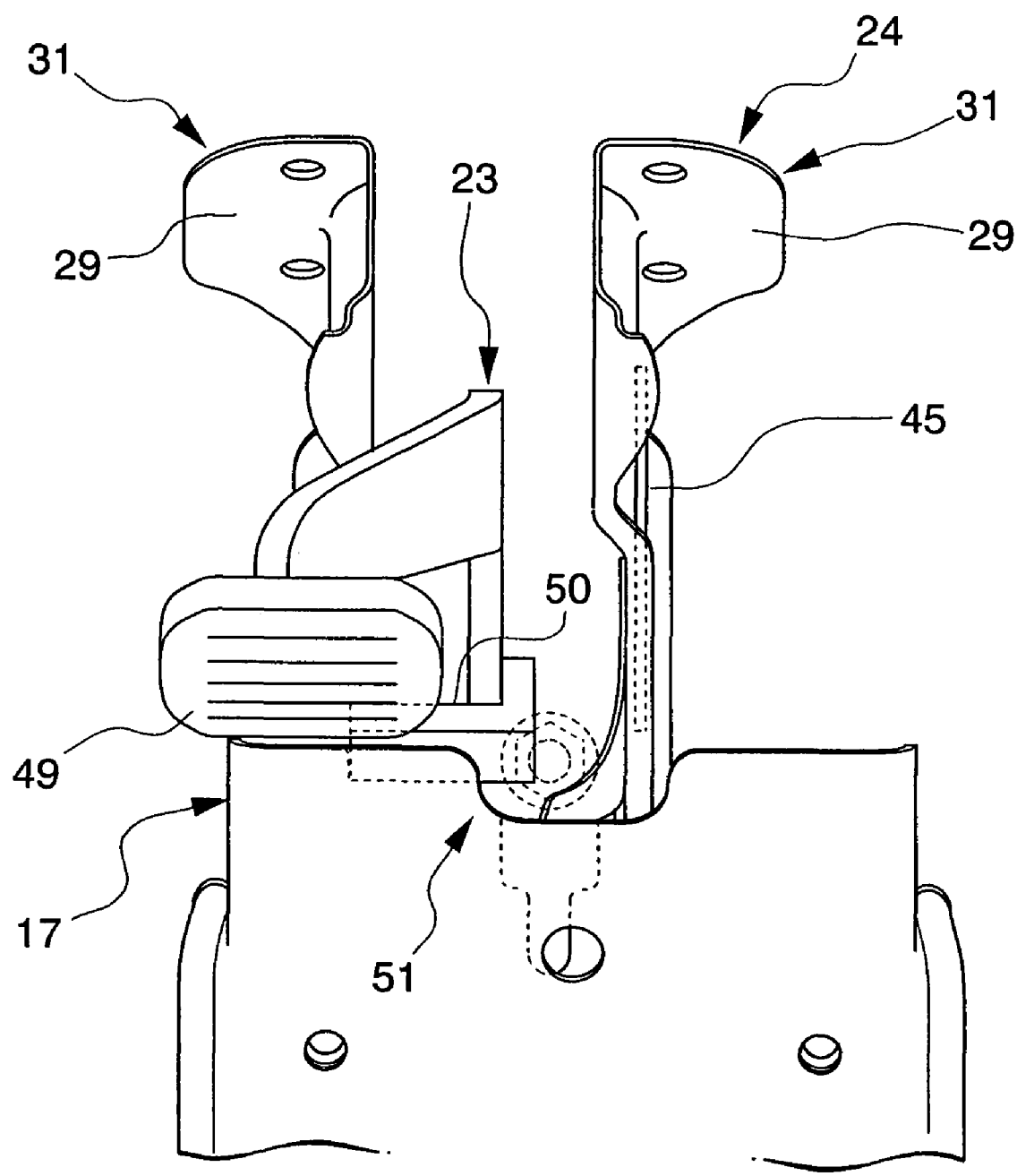
FIG. 9 is a bottom view showing in outline, the pedal retraction amount control apparatus according to the embodiment of the present invention, showing another condition at the time of a head-on collision of the vehicle.

Then, if the pedal 23 moves further, the displacement restricting section 50 provided beneath the support shaft 27 is pushed by the steering hanger 17, and as a result, as shown in FIG. 7 and FIG. 9, the pedal 23 rotates in the forward direction to move the tread portion 49 forward.

Figure 10:
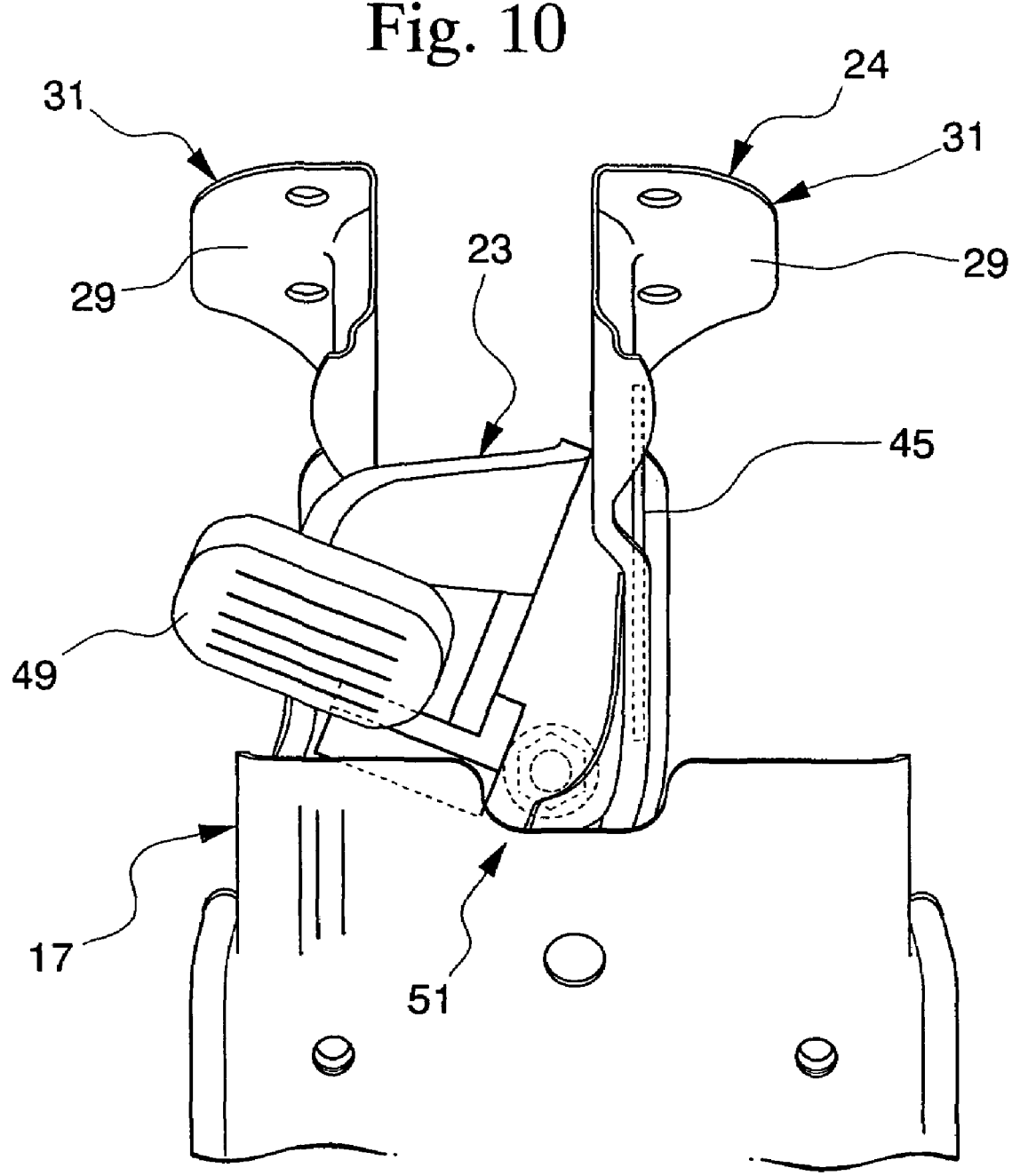
FIG. 10 is a bottom view showing in outline, the pedal retraction amount control apparatus according to the embodiment of the present invention, showing yet another condition at the time of a head-on collision of the vehicle.

Furthermore, when the pedal bracket 24 secured to the dash panel 12 moves as described above in the rear direction, then as shown in FIG. 3 and FIG. 4, this shifts in the rear direction from the engaging bolt 39 of the cowl panel 32, so that the engaging bolt 39 comes out from the punch aperture 43 thereby separating from the cowl panel 32, and only the front portion is in a cantilever condition. In this condition, the pedal 23 is pressed by the steering hanger 17 and rotates as far as the rotation limit, and when further pressed, since the displacement restricting section 50 extends to the side in the crosswise direction of the vehicle, a twisting force is input to the pedal 23 in a direction to move the displacement restricting section 50 from the left side to the front side while turning about a rotation axis. As a result, as shown in FIG. 10, the pedal bracket 24 in a condition cantilevered by only the front portion, is deformed so that the support member 31 on the extension side of the displacement restricting section 50 is crushed, and the pedal 23 falls to the right side and the front side so as to turn about a vertical rotation axis, and the tread portion 49 is moved even further in the front direction. At this time, due to the reinforcing member 45, the pedal bracket 24 is easily deformed by the aforementioned twisting force since the rigidity of the support member 31 on the extension side of the displacement restricting section 50 is lower than the rigidity of the support member 31 on the opposite side.

Figure 11:
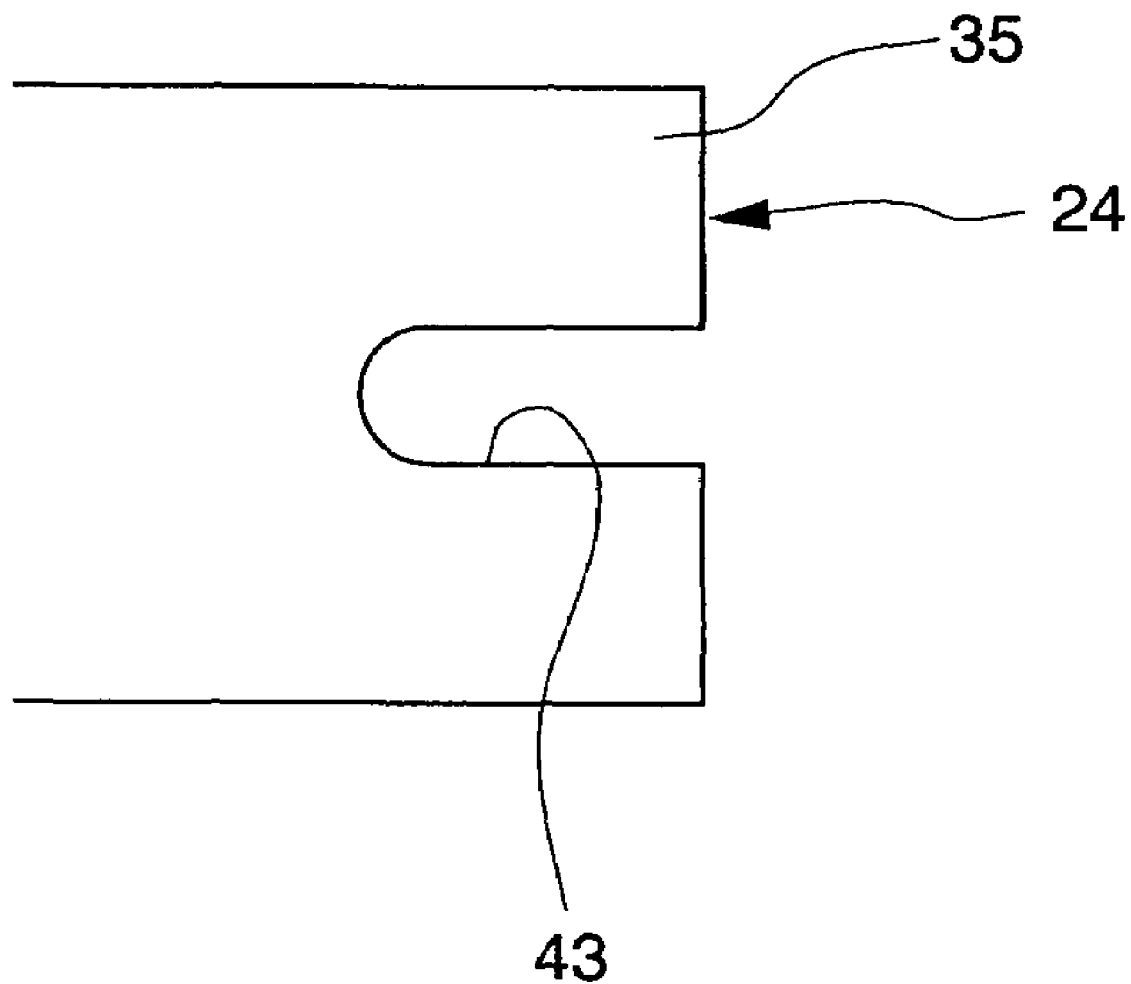
FIG. 11 is a partial plan view showing another example of a pedal bracket of the pedal retraction amount control apparatus according to the embodiment of the present invention.

In the case where the cowl panel is moved to rearward quicker than the dash panel 12, then as shown in FIG. 11, by making the punch aperture 43 with a slit which opens in the rearward direction (the right direction in FIG. 11), the separation of the pedal bracket 24 from the cowl panel 32 can be performed quickly, so that this does not prevent the retraction inhibition of the pedal bracket 24.

According to the pedal retraction amount control apparatus 51 of the present embodiment as described above, since the pedal bracket 24 is deformed as mentioned above, the pedal 23 goes beyond the rotation amount about the support shaft 27 of the pedal 23, and moves further in the forward direction. Therefore the pedal 23 can be sufficiently moved in the forward direction.

Furthermore, since the pedal bracket 24 is made with the rigidity on the extension side of the displacement restricting section 50 lower than the rigidity on the opposite side, then when a twisting force is input to the pedal 23 in a direction to move the displacement restricting section 50 in the forward direction while turning about a vertical rotation axis, the pedal bracket 24 is easily deformed. Consequently the pedal 23 falls over so as to reliably turn about a vertical rotation axis, and the tread portion 49 is reliably moved in the forward direction. Consequently, the pedal 23 can be moved sufficiently and reliably from the passenger compartment in the forward direction.

Moreover, since the rigidity of the pedal bracket 24 in the crosswise direction is made different by attaching the reinforcing member 45 to one side, the rigidity in the crosswise direction cart be easily changed.

In addition, since the pedal 23 is made with the central portion in a curved shape, then when the pedal 23 falls over so as to turn about a vertical rotation axis, the tread portion 49 can be made to move even more in the forward direction of the vehicle.

Furthermore, when the pedal 23 falls over so as to turn about a vertical rotation axis, and the tread portion 49 is moved in the forward direction of the vehicle, the pedal 23 which falls over to the extension side of the displacement restricting section 50 does not interfere with the steering shaft 46 on the opposite side to the extension side of the displacement restricting section 50. As a result, turning of the pedal 23 about a vertical rotation axis is not restricted by interference with the steering shaft 46. Consequently, the pedal 23 can be even more sufficiently turned about a vertical rotation axis, and the pedal 23 can be more sufficiently moved from the passenger compartment 11 in the forward direction of the vehicle.

Here, there is a case where depending on the mode of collision, the pedal bracket 24 moves in the lengthwise direction without being deformed. However, in this case, the pedal bracket 24 moves to above the horizontal beam member 16, and interference of the pedal bracket 24 with the horizontal beam member 16 can be prevented.

The above description took as an example a pedal retraction amount control apparatus 51 that moves a brake pedal as the pedal 23, forward. However, if the abovementioned pedal is changed to a clutch pedal rather than a brake pedal, then this can be a pedal retraction amount control apparatus for a clutch pedal.

As described in detail above, according to the pedal retraction amount control apparatus of the first aspect of the present invention, by inputting a twisting force to the pedal in a direction to move the displacement restricting section in the forward direction of the vehicle while turning about a vertical rotation axis, so as to deform the pedal bracket, the pedal falls over so as to turn about a vertical rotation axis. Hence the pedal goes beyond the rotation amount about the support shaft of the pedal, and moves further forward, so that this moves sufficiently in the forward direction of the vehicle. Consequently, the pedal can be moved sufficiently from the passenger compartment in the forward direction.

According to the pedal retraction amount control apparatus of the second aspect of the invention, when a twisting force is input to the pedal in a direction to move the displacement restricting section in the forward direction while turning about a rotation axis, since the rigidity of the pedal bracket on the extension side of the displacement restricting section is lower than the rigidity on the opposite side, this is easily deformed. Therefore, the pedal falls over so that the pedal is reliably turned about a vertical rotation axis, and the tread portion is reliably moved further in the forward direction. As a result the pedal goes beyond the rotation amount about the support shaft of the pedal and moves reliably in the forward direction. Consequently, the pedal can be moved sufficiently and reliably from the passenger compartment in the forward direction.

According to the pedal retraction amount control apparatus of the third aspect of the present invention, since the rigidity of the pedal bracket in the crosswise direction is made different by attaching the reinforcing member to one side, the rigidity in the crosswise direction can be easily changed.

According to the pedal retraction amount control apparatus of the fourth aspect of the present invention, since the central portion of the pedal is bent to form a curved shape, then when the pedal falls over so as to turn about a vertical rotation axis, the tread portion can be made to move even more in the forward direction.

According to the pedal retraction amount control apparatus of the fifth aspect of the invention, in the case where the pedal bracket moves along the lengthwise direction, the pedal bracket moves above the horizontal beam member, and interference of the pedal bracket with the horizontal beam member can be prevented.

According to the pedal retraction amount control apparatus of the sixth aspect of the present invention, when the pedal falls so as to turn about a rotation axis, and the tread portion is moved in the forward direction of the vehicle, the pedal which falls over to the extension side of the displacement restricting section does not interfere with the steering shaft on the opposite side to the extension side of the displacement restricting section. As a result, the turning of the pedal about a vertical rotation axis is not restricted by interference with the steering shaft. Consequently, the pedal can be even more sufficiently turned about a vertical rotation axis, and the pedal can be more sufficiently moved from the passenger compartment in the forward direction.

What is claimed is:

1. A pedal retraction amount control apparatus comprising:
   a pedal bracket supporting a support shaft of a pedal and having a front portion and a rear portion, said front portion being secured to a dash panel, and said rear portion being attached to a cowl panel so as to be detachable when the pedal bracket is moved rearward of a vehicle;
   a displacement restricting section having an extension portion extending further from one side of a portion of said pedal than an opposite side in a lateral direction of said vehicle; and
   a steering hanger arranged so as to face a rearward portion of said extension portion of said displacement restricting section.

2. A pedal retraction amount control apparatus according to claim 1, wherein said pedal bracket comprises a first portion and a second portion that is located closer, in said lateral direction, to said extension portion than said first portion, and a rigidity of said second portion is made smaller than a rigidity of said first portion.

3. A pedal retraction amount control apparatus according to claim 2, wherein a reinforcing member is attached to said first portion of said pedal bracket.

4. A pedal retraction amount control apparatus according to claim 1, wherein a central portion of said pedal is curved so as to form a curved portion.

5. A pedal retraction amount control apparatus according to claim 1, wherein said pedal bracket is elongated in a direction connecting between said front portion and said rear portion, and a horizontal beam member which connects between two pillars located in a forward portion of said vehicle and which supports said steering hanger, is provided below said pedal bracket parallel with an extension direction thereof.

6. A pedal retraction amount control apparatus according to claim 2, wherein a steering shaft is arranged at a position close to said first portion of said pedal bracket.

7. A pedal retraction amount control apparatus comprising:
   a pedal bracket supporting a support shaft of a pedal and having a front portion and a rear portion, said front portion being secured to a dash panel, and said rear portion being attached to a cowl panel;
   a displacement restricting section having an extension portion extending further from one side of a portion of said pedal than an opposite side in a lateral direction of said vehicle; and
   a steering hanger arranged so as to face a rearward portion of said extension portion of said displacement restricting section, wherein
   a push rod for driving a brake booster is permanently connected to said pedal when said vehicle is in a front collision.

8. A pedal retraction amount control apparatus according to claim 7, wherein said pedal bracket comprises a first portion and a second portion that is located closer, in said lateral direction, to said extension portion than said first portion, and a rigidity of said second portion is made smaller than a rigidity of said first portion.

9. A pedal retraction amount control apparatus according to claim 8, wherein a reinforcing member is attached to said first portion of said pedal bracket.

10. A pedal retraction amount control apparatus according to claim 7, wherein a central portion of said pedal is curved so as to form a curved portion.

11. A pedal retraction amount control apparatus according to claim 7, wherein said pedal bracket is elongated in a direction connecting between said front portion and said rear portion, and a horizontal beam member which connects between two pillars located in a forward portion of said vehicle and which supports said steering hanger, is provided below said pedal bracket parallel with an extension direction thereof.

12. A pedal retraction amount control apparatus according to claim 7, wherein a steering shaft is arranged at a position close to said first portion of said pedal bracket.

13. A pedal retraction amount control apparatus comprising:
   a pedal bracket supporting a support shaft of a pedal and having a front portion and a rear portion, said front portion being secured to a dash panel, and said rear portion being attached to a cowl panel so as to be detachable when said pedal bracket is moved rearward of a vehicle;
   a displacement restricting section having an extension portion extending from a portion of said pedal below said support shaft in a lateral direction of said vehicle; and
   a steering hanger arranged so as to face a rearward portion of said extension portion of said displacement restricting section, wherein
   said cowl panel engages a mounting hole defined by said pedal bracket, said mounting hole being configured to permit detachment of said pedal bracket from said cowl panel when said pedal bracket is moved rearward.

14. A pedal retraction amount control apparatus according to claim 13, wherein said cowl panel includes an attachment bolt having a head portion, said head portion being configured to disengage from said mounting hole when said pedal bracket is moved rearward.

15. A pedal retraction amount control apparatus according to claim 14, wherein said mounting hole includes first and second portions, said first portion being sized to retain said head portion and said second portion being sized to permit disengagement of said head portion.

* * * * *